United States Patent
Kunii et al.

(10) Patent No.: US 11,447,235 B2
(45) Date of Patent: Sep. 20, 2022

(54) UNMANNED AERIAL VEHICLE

(71) Applicant: PRODRONE CO., LTD., Nagoya (JP)

(72) Inventors: Shinya Kunii, Nagoya (JP); Shinichi Maki, Nagoya (JP)

(73) Assignee: PRODRONE CO., LTD., Aichi (JP)

( * ) Notice: Subject to any disclaimer, the term of this patent is extended or adjusted under 35 U.S.C. 154(b) by 127 days.

(21) Appl. No.: 16/982,291

(22) PCT Filed: Jul. 16, 2019

(86) PCT No.: PCT/JP2019/027864
§ 371 (c)(1),
(2) Date: Sep. 18, 2020

(87) PCT Pub. No.: WO2020/017488
PCT Pub. Date: Jan. 23, 2020

(65) Prior Publication Data
US 2021/0001974 A1   Jan. 7, 2021

(30) Foreign Application Priority Data

Jul. 17, 2018  (JP) .............................. JP2018-134222

(51) Int. Cl.
*B64C 27/08*   (2006.01)
*B64C 11/34*   (2006.01)
*B64C 39/02*   (2006.01)

(52) U.S. Cl.
CPC .............. *B64C 11/34* (2013.01); *B64C 27/08* (2013.01); *B64C 39/02* (2013.01)

(58) Field of Classification Search
CPC .......... B64C 39/02; B64C 11/34; B64C 27/08
See application file for complete search history.

(56) References Cited

U.S. PATENT DOCUMENTS

2016/0311528 A1   10/2016  Nemovi et al.
2016/0325834 A1*  11/2016  Foster .................... B64D 27/24
(Continued)

FOREIGN PATENT DOCUMENTS

JP   2017-185945 A   10/2017
WO  2017/035593 A1   3/2017

OTHER PUBLICATIONS

Aug. 27, 2019 Search Report issued in International Patent Application No. PCT/JP2019/027864.

*Primary Examiner* — Michael L Sehn
(74) *Attorney, Agent, or Firm* — Oliff PLC (57) ABSTRACT

To provide an unmanned aerial vehicle that eliminates or minimizes the laboriousness involved in optimal pitch adjustment of propellers while eliminating or minimizing complexity and instability in airframe structure and/or flight programs. This object is solved by an unmanned aerial vehicle that is provided with a plurality of rotors and that includes: a center frame that is a central portion of an airframe of the unmanned aerial vehicle; and a plurality of arms extending radially from the center frame in plan view. A plurality of motors that are driving sources of the respective rotors are provided in the center frame. The plurality of rotors are supported by the respective arms. Each arm of the arms has a hollow cylindrical structure. A motive power transmission member configured to transmit a driving force of each motor of the motors to the each rotor is provided in the each arm.

6 Claims, 8 Drawing Sheets

(56) References Cited

U.S. PATENT DOCUMENTS

2017/0183074 A1\* 6/2017 Hutson .................. B64C 25/52
2017/0253326 A1  9/2017 Mullins
2019/0161179 A1  5/2019 Uebori et al.

\* cited by examiner

UNMANNED AERIAL VEHICLE

TECHNICAL FIELD

The present invention relates to an unmanned aerial vehicle technique.

BACKGROUND ART

In recent years, there have been improvements in sensors and software used in posture control and/or autonomous flight of unmanned aerial vehicles. As a result, performance and manipulability of unmanned aerial vehicles have improved to a significant degree. In particular, multi-copters that fly using a plurality of fixed pitch propellers are simpler in rotor structure than helicopters and thus easier to design and maintain. As such, multi-copters are expected to be applied to various missions in a wide range of industrial fields.

Patent literature 1, listed below, discloses a multi-copter provided with a variable pitch mechanism for a rotor.

CITATION LIST

Cited Literature

PTL1: JP 2017-185945A

SUMMARY OF INVENTION

Technical Problem

A commercially available typical multi-copter employs such a structure that a motor is provided at a leading end portion of each arm and that a fixed pitch propeller is directly connected to an output portion of the motor. In this multi-copter, however, as the weight of the leading end portion of the arm increases, it becomes more difficult to keep the posture of the multi-copter stable because of the influence of inertia of the leading end portion of the arm, to the detriment of stability and agility of flight motions. The influence increases especially in the invention disclosed in the above-described patent literature 1, which has such a configuration that the pitch changing mechanism and the driving source of the mechanism are provided at the leading end portion of the arm.

In light of the above-described problems, a problem to be solved by the present invention is to provide an unmanned aerial vehicle in which the weight of a leading end portion of an arm supporting a rotor is decreased.

Solution to Problem

In order to solve the above-described problem, the present invention provides an unmanned aerial vehicle that includes: a plurality of rotors; a center frame that is a central portion of an airframe of the unmanned aerial vehicle; and a plurality of arms extending radially from the center frame in plan view. A plurality of motors that are driving sources of the respective rotors are provided in the center frame. The plurality of rotors are supported by the respective arms. Each arm of the arms has a hollow cylindrical structure. A motive power transmission member configured to transmit a driving force of each motor of the motors to the each rotor is provided in the each arm.

Motors are provided in a central part (center frame) of the airframe, and the output of each motor is transmitted to each rotor via a motive power transmission member. This ensures that the weight of the leading end portion of each arm is decreased. As a result, stability and agility of flight motions of the unmanned aerial vehicle improve.

Also, in this context, it is preferable that: a plurality of motors that are driving sources of the respective rotors are provided in the center frame such that the output shaft of the each motor is pointed toward the each arm; a drive shaft that is a bar-shaped rotation shaft is passed through the each arm; a base end portion of the drive shaft is connected to the each motor; and a leading end portion of the drive shaft is connected, via a bevel gear, to a base end portion of a rotor shaft that is a rotation shaft of the rotor.

For example, when a toothed belt is employed as a motive power transmission member, it is necessary to make the output shaft of the motor stand perpendicularly (vertically) in the center frame, resulting in degraded spatial efficiency in the center frame. By employing a drive shaft as a motive power transmission member as in this configuration, the motor can be arranged such that the output shaft of the motor is pointed toward the arm. This increases the spatial efficiency in the center frame.

Also, the unmanned aerial vehicle according to the present invention may further include: a pitch changing mechanism configured to change pitch angles of the plurality of rotors; and a speed controller configured to control a rotational speed of each rotor of the rotors. In this context, the unmanned aerial vehicle may have such a configuration that: the pitch changing mechanism changes the pitch angles of the rotors such that the pitch angles of the rotors are identical to each other; and the unmanned aerial vehicle makes a mid-air movement by controlling the rotational speed of the each rotor.

A fixed pitch propeller has a simpler structure and thus is easier to design and maintain. A difficult point is that in order to change the pitch angle of the propeller, it is necessary to replace the propeller itself. In particular, in order to identify a pitch angle optimal for weather conditions at the flight time and/or the payload, it is necessary in some situations to perform propeller replacement work a number of times before a flight. A possible measure to solve the problem is to employ a variable pitch rotor. However, a pitch changing mechanism of a rotor has a large number of piece-parts, leaving a concern over complexity of the airframe structure and/or the flight program. Complexity of design and/or degradation of maintainability may hinder the advantages inherent in a multi-copter.

The pitch changing mechanism according to the present invention changes the pitch angles of the rotors such that the pitch angles are identical angles, instead of adjusting the pitch angles of the rotors individually. Because of this configuration, the control of the pitch angle can not make the thrusts of the rotors uneven and make the unmanned aerial vehicle fly horizontally.

The unmanned aerial vehicle having the above-described configuration uses the pitch changing mechanism for the sole purpose of uniformly adjusting the pitch angles of the rotors, and makes mid-air movements mainly by controlling the rotational speeds of the rotors. In other words, the above-described pitch changing mechanism makes the pitch angle of the fixed pitch propeller changeable without replacing the propeller, and thus is different from typical pitch changing mechanisms in application and technical concept.

The above-described pitch changing mechanism is limited in function and application and thus is simplified in structure. Further, the unmanned aerial vehicle according to the present invention makes mid-air movements mainly by controlling the rotational speeds of the rotors. This ensures that an existing flight controller for a multi-copter can be used without modifications. As a result, the above-described pitch changing mechanism eliminates or minimizes the laboriousness involved in optimal propeller pitch adjustment while eliminating or minimizing complexity and instability of the airframe structure and/or the flight program.

Also, in this context, the pitch changing mechanism preferably changes the pitch angles of the plurality of rotors simultaneously by an identical angle while keeping the pitch angles of the rotors identical to each other.

When the airframe of a multi-copter having fixed pitch propellers is pushed upward by an ascending air current while the multi-copter is making a flight, the multi-copter maintains its altitude by decreasing the propeller rotational frequency (equivalent in meaning to rotational speed). When the multi-copter is blown by a strong ascending air current, it is, naturally, necessary to decrease the rotational frequency accordingly. However, for a propeller to exhibit its inherent functions, it is necessary to keep a rotational frequency at which a sufficient level of gyro effect is obtained. If the propeller rotational frequency is decreased below its lower limit, the propeller may stall, turning the multi-copter into unsteerable state. While it is desirable to rotate a propeller at low rpm in order to increase the energy efficiency of the rotor, a rotation at low rpm means making the multi-copter vulnerable to an ascending air current at the same time.

The pitch changing mechanism is capable of changing the pitch angles of the plurality of rotors simultaneously by an identical angle while keeping the pitch angles of the rotors identical to each other. This ensures that if there is a concern over instability of the posture of the airframe state because of, for example, an ascending air current, the rotational frequencies of the rotors are maintained by temporarily decreasing the pitch angles of the rotors, thereby decreasing the thrusts relative to the rotational frequencies of the rotors. In this manner, the rotors can be prevented from stalling.

Also, the pitch changing mechanism preferably includes one motor or a plurality of motors that is a driving source of the pitch changing mechanism, and a number of the motor is preferably smaller than a number of the rotors. In this context, the pitch changing mechanism more preferably changes all the pitch angles of the plurality of rotors using the one motor, which is the driving source of the pitch changing mechanism.

The pitch changing mechanism according to the present invention changes the pitch angles of the plurality of rotors such that the pitch angles of the rotors are identical angles. This feature ensures that the pitch angles of all the rotors can be adjusted simultaneously using a smaller number of motors. If the pitch changing mechanism includes a motor on an each-rotor basis, the number of motors provided increases as the number of rotors increases, resulting in an increase in aircraft weight and power consumption. By driving the pitch changing mechanism using a smaller number of motors than the number of rotors, the above difficult point involved in employing a pitch changing mechanism is eliminated or minimized. In particular, when a single motor is used, the accuracy with which the pitch angles are synchronized increases, in addition to maximization of the weight decreasing effect and the energy saving effect in the pitch changing mechanism.

Also, in this context, the each rotor may include: a blade that is a rotary wing; and a rotor hub to which the blade is connected, the rotor hub being connected to a rotor shaft that is a rotation shaft of the rotor. The pitch changing mechanism may include, in the each rotor: a slider member connected to the blade via a pitch link that is a link member; a pitch leveler that is a mechanism configured to lift the slider member upward and downward along the rotor shaft; and a first control rod that is a bar-shaped link member for operating the pitch leveler, the first control rod extending from the center frame along the each arm. The pitch changing mechanism may be configured to change the pitch angles of the rotors by reciprocating all first control rods along the respective arms simultaneously by an identical distance.

As described earlier, in a multi-copter, as the weight of the leading end portion of the arm increases, it generally becomes more difficult to keep the posture of the multi-copter stable because of the influence of inertia of the leading end portion of the arm, to the detriment of stability and agility of flight motions. Further, the load object carried on the leading end portion of the arm prevents the rotor's exhaust stream, making the rotor's propelling direction instable. By making the pitch angles of the rotors adjustable from the center frame via the first control rod, the driving source of the pitch changing mechanism can be provided at a central portion of the airframe. This makes the weight of the leading end portion of each arm lighter, and reduces the influence that providing the pitch changing mechanism has on stability and agility of flight motions.

Advantageous Effects of Invention

Thus, the unmanned aerial vehicle according to the present invention reduces the weight of the leading end portion of an arm supporting a rotor.

DESCRIPTION OF EMBODIMENTS

An embodiment of the present invention will be described below. The following embodiment is an example of a multi-copter 10, which is an unmanned aerial vehicle provided with a plurality of rotors. It is to be noted that in the following description, the terms "upper", "upward", "lower", "downward", and "perpendicular" refer to directions parallel to the Z axis of the coordinate system representation illustrated in FIGS. 1 and 2, with the term "upper" referring to the arrow-headed direction of the Z axis. It is to be noted that the term "horizontal" refers to the X-Y plane (directions) in the coordinate system representation.

(Configuration Outline)

Figure 1:
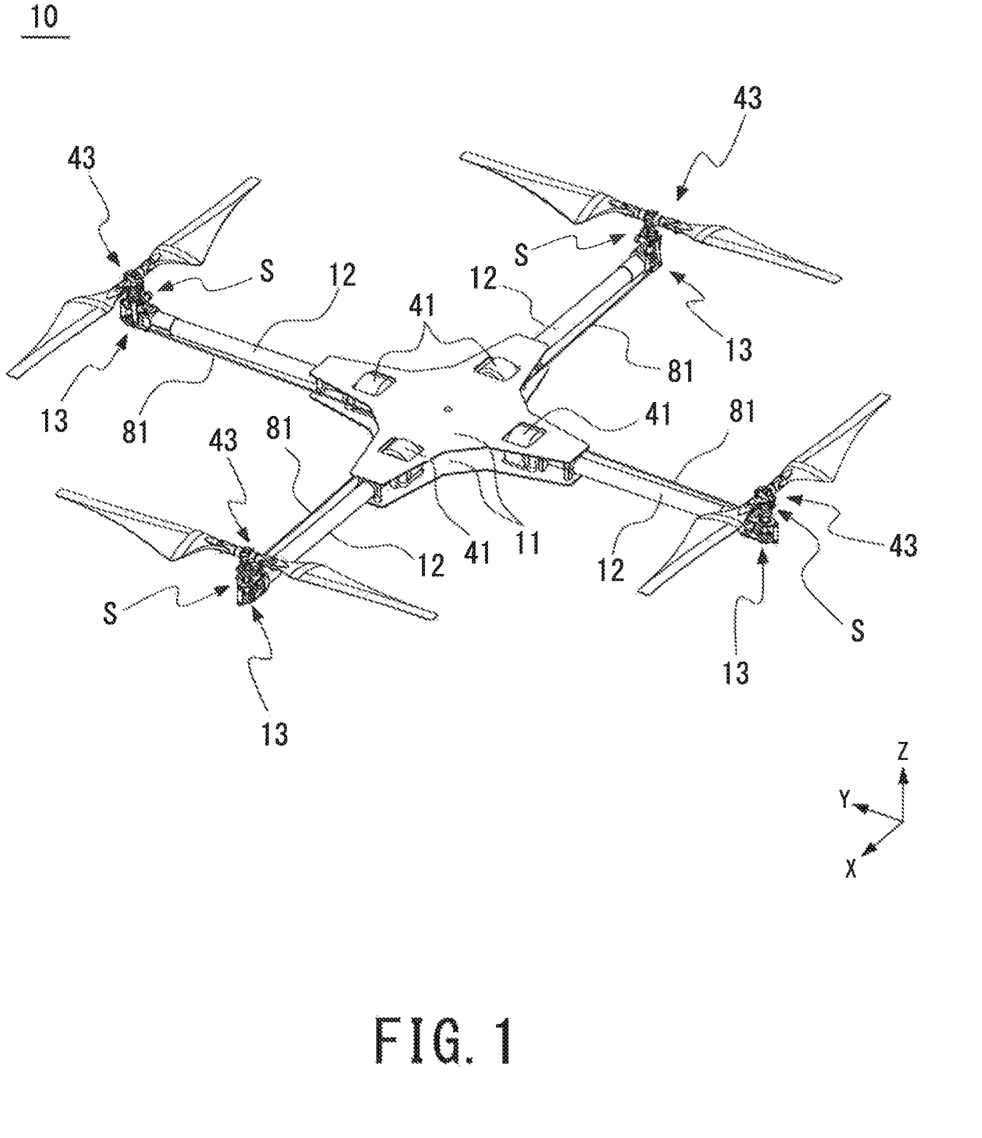
FIG. 1 is a perspective view of an exterior of a multi-copter according to this embodiment.
Figure 2:
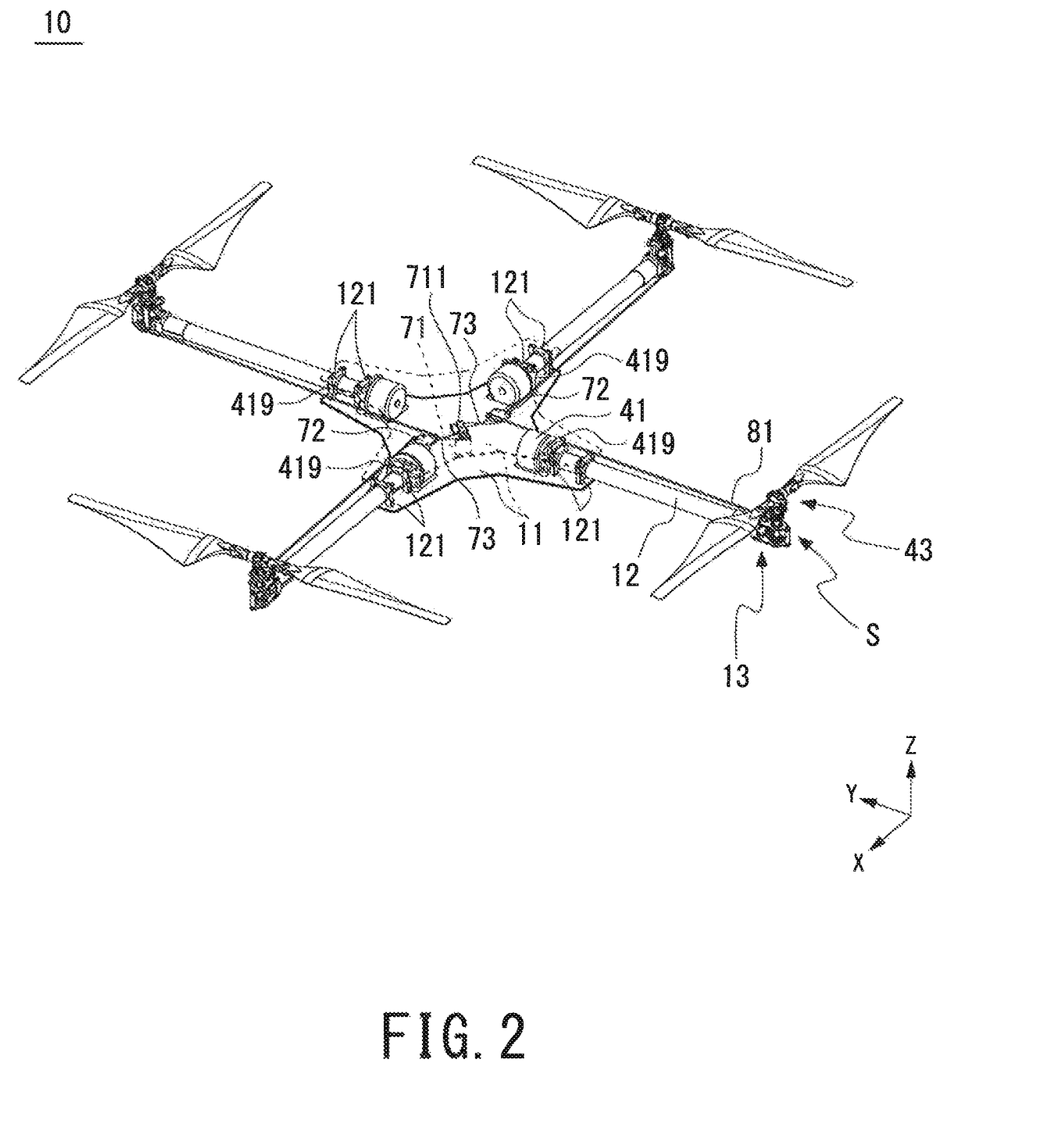
FIG. 2 is a see-through perspective view of the multi-copter of FIG. 1 illustrating an internal configuration of a center frame.

FIG. 1 is a perspective view of an exterior of the multi-copter 10 according to this embodiment (hereinafter also referred to as "this example"). FIG. 2 is a see-through perspective view of the multi-copter 10 illustrating an internal configuration of a center frame 11 illustrated in FIG. 1. FIGS. 1 and 2 are for describing mechanical structures associated with driving and control of rotors 43, which are provided in the multi-copter 10. In actual situations, a flight controller FC, an ESC 24, and a battery 60, among other elements described later, are incorporated in the multi-copter 10. Other possible examples of elements include a cover member covering the center frame 11, a landing gear, and external devices that may be necessary in particular applications.

The multi-copter 10 according to this example includes: the center frame 11, which is a frame member provided at a central portion of the airframe; and four arms 12, which are extend radially from the center frame 11 in plan view. The center frame 11 has such a configuration that flat plate materials each having an approximately cross shape in plan view are superimposed on each other such that the flat plate materials are parallel to each other. Each of the arms 12 is a hollow-cylindrical pipe material and extends from each end portion of the cross of the center frame 11 in the direction in which the end portion extends. Each arm. 12, at its base end portion, is fixed to an inside of the center frame 11 via an arm clamp 121, which is a clamp member. Also, each arm 12, at its leading end portion, supports a rotor 43.

In the multi-copter 10 according to this example, motors 41 are provided in the center frame 11. The motors 41 are driving sources of the respective rotors 43. Each of the motors 41 is fixed to a motor mount 419, which is provided in the center frame 11, such that the output shaft of the motor 41 is pointed toward the corresponding arm 12. The output of the motor 41 is transmitted to the corresponding rotor 43 via a motive power transmission member provided in the arm 12.

In a commercially available, typical multi-copter, a widely employed structure is that a motor is provided at the leading end portion of each arm and that a fixed pitch propeller is directly connected to an output portion of the motor. In multi-copters, however, as the weight of the leading end portion of the arm increases, it becomes more difficult to keep the posture of the multi-copter stable because of the influence of inertia of the leading end portion of the arm, to the detriment of stability and agility of flight motions. In the multi-copter 10 according to this example, the motors 41 are provided in the center frame 11. This reduces the weight of the leading end portion of the arm 12, resulting in improved stability and agility of flight motions.

Also, the rotors 43 according to this example are variable pitch propellers, whose pitch angles are variable. As detailed later, the multi-copter 10 according to this example adjusts the pitch angles of the rotors 43 such that the pitch angles of the rotors 43 are identical angles; and the multi-copter 10 makes mid-air movements mainly by rotational speed control of the rotors 43. This eliminates or minimizes the laboriousness involved in optimal propeller pitch adjustment while eliminating or minimizing complexity and instability of the airframe structure and/or the flight program.

(Pitch Changing Mechanism)

Figure 3:
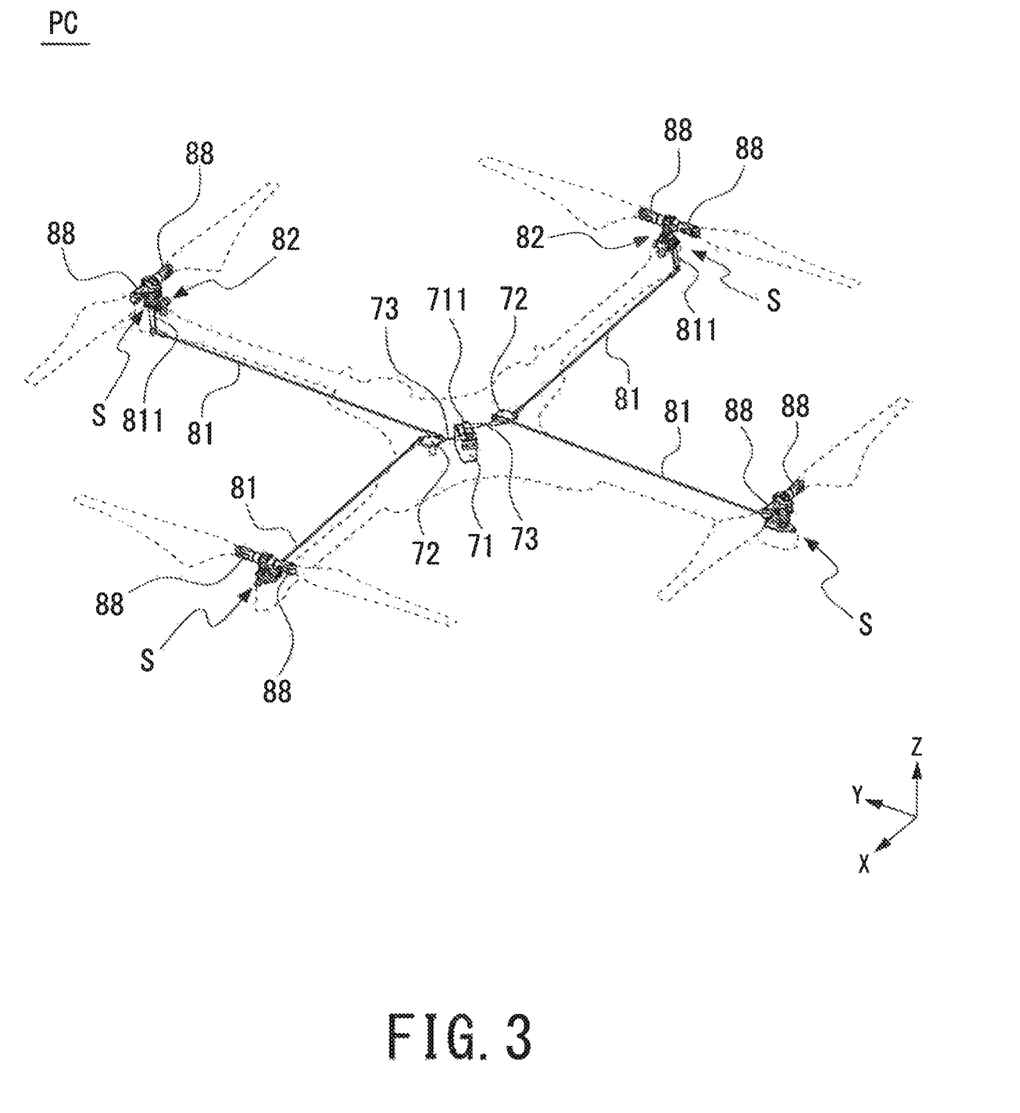
FIG. 3 is a see-through perspective view of the multi-copter illustrating a configuration of a pitch changing mechanism of the multi-copter.
Figure 4:
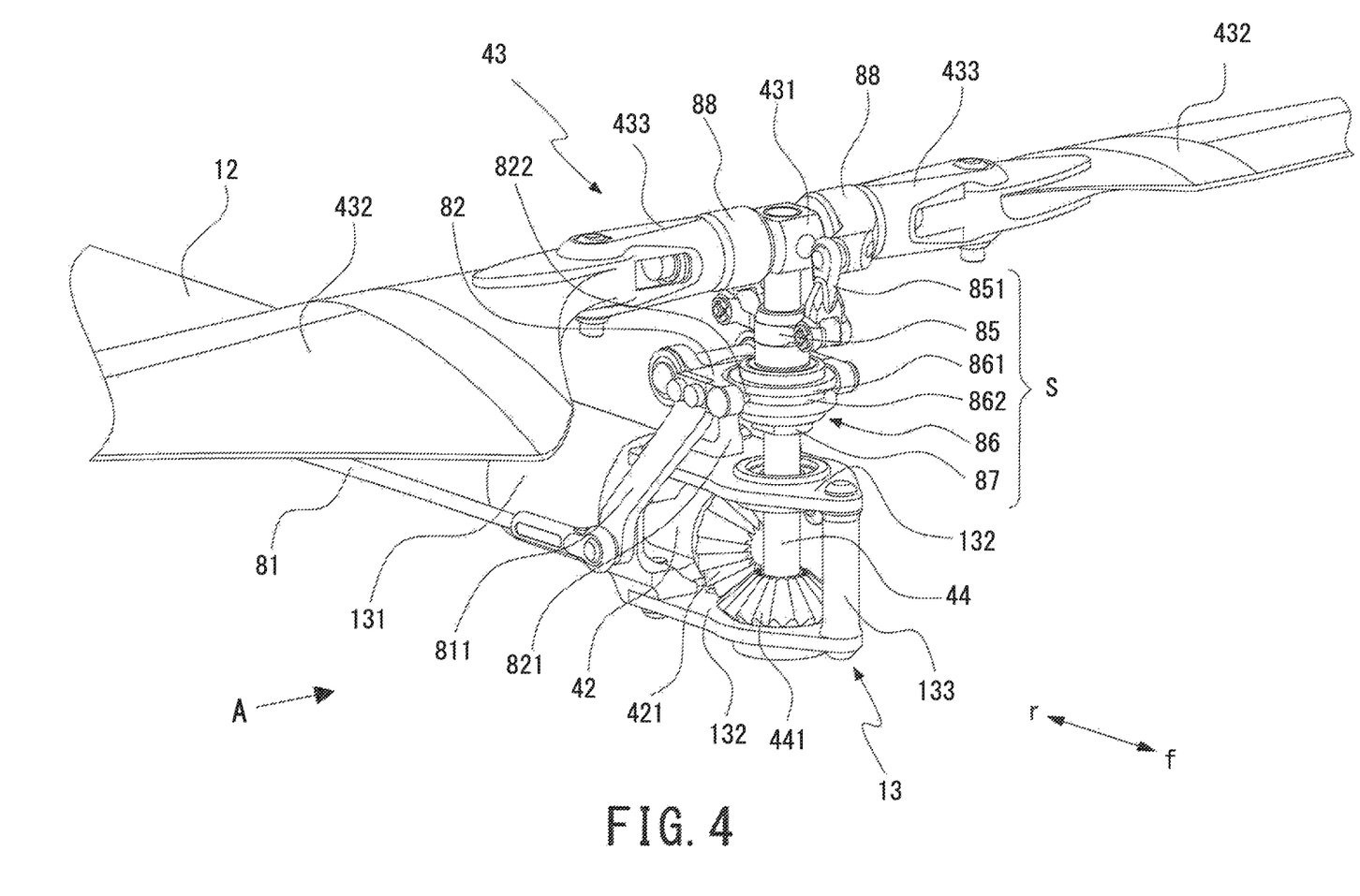
FIG. 4 is a partially enlarged view of a leading end portion of an arm illustrating its mechanism.

FIG. 3 is a see-through perspective view of the multi-copter 10 illustrating a configuration of a pitch changing mechanism PC. FIG. 4 is a partially enlarged view of the leading end portion of an arm 12 illustrating its mechanism.

As described earlier, the pitch changing mechanism PC according to this example does not adjust the pitch angles of the rotors 43 individually; instead, the pitch changing mechanism PC changes the pitch angles of the rotors 43 simultaneously by an identical angle while keeping the pitch angles of the rotors 43 identical to each other. Because of this configuration, the pitch changing mechanism PC is not capable of controlling the pitch angles to make the thrusts of the rotors 43 uneven. That is, the pitch changing mechanism PC can not be used to make the airframe fly horizontally.

The pitch changing mechanism PC according to this example mainly includes a servo motor 71, first control rods 81, pitch levers 82, and slider members S.

The servo motor 71 are driving sources of the pitch changing mechanism PC. Each of the servo motor 71 is fixed to the center frame 11, and an elliptic servo horn 711, which is an output portion of the servo motor 71, is provided at a central portion of the center frame 11. Second control rods 73, which are bar-shaped link members, are connected to the servo horn 711 such that one end portion of one second control rod 73 is connected to one end portion of the servo horn 711 in its longitudinal direction and that one end portion of the other second control rod 73 is connected to the other end portion of the servo horn 711 in its longitudinal direction. The other end portions of the second control rods 73 are connected to respective control hubs 72.

The control hubs 72 are hub members supported by the lower plate of the center frame 11. In plan view of the center frame 11, the control hubs 72 according to this example are a pair forming a point-symmetry across the center of rotation of the servo horn 711. Each of the control hubs 72 is a fan-shaped member in plan view and rotatable horizontally about a portion (center of rotation) corresponding to the central angle of the fan-shape. The other end portion of each second control rod 73 is connected to a portion corresponding to the center of the arc of the fan-shape of the corresponding control hub 72. This enables the pair of control hubs 72 to rotate mutually symmetrically within a range of a predetermined angle in conjunction with the servo horn 711.

The fan-shape of each control hub 72 has two radius edges, and one end portion (base end portion) of the first control rod 81, which is a bar-shaped link member, is connected to a portion of each radius edge at or near its leading end portion. To each control hub 72, two first control rods 81 are connected, with the control hubs 72 manipulating a total of four first control rods 81. The four first control rods 81 are arranged such that each first control rod 81 extends along a different arm 12.

The above-described configuration enables the pitch changing mechanism PC according to this example to make the four first control rods 81 reciprocate simultaneously by an identical distance using the single servo motor 71. It is to be noted that as detailed later, the other end portions of the first control rods 81 are connected to the respective slider members S and that by making the first control rods 81 reciprocate along the respective arms 12, the pitch angles of all the rotors 43 can be changed via the slider members S.

As described earlier, the pitch changing mechanism PC according to this example changes the pitch angles of the four rotors 43 such that the pitch angles of the rotors 43 are identical angles. This feature ensures that the pitch angles of all the rotors 43 can be adjusted simultaneously using the single servo motor 71. If the pitch changing mechanism includes a motor on an each-rotor basis, the number of motors provided increases as the number of rotors increases, resulting in an increase in aircraft weight and power consumption. In the multi-copter 10 according to this example, the pitch changing mechanism PC is driven by the single servo motor 71. This eliminates or minimizes the above difficult point involved in the employment of the pitch changing mechanism PC. It is to be noted that while in this example the accuracy with which the pitch angles are synchronized is increased by employing the configuration in which the single servo motor 71 is provided, it is also possible to provide a smaller number of servo motors 71 than the number of rotors 43 to drive the pitch changing mechanism PC, in which case a fair level of weight decreasing effect and/or a fair level of energy saving effect can be obtained.

In multi-copters, as the weight of the leading end portion of the arm increases, it generally becomes more difficult to keep the posture of the multi-copter stable because of the influence of inertia of the leading end portion of the arm, to the detriment of stability and agility of flight motions. Further, the load object carried on the leading end portion of the arm prevents the rotor's exhaust stream, making the rotor's propelling direction instable. In the pitch changing mechanism PC according to this example, the pitch angles of the rotors 43 are adjustable from the center frame 11 via the first control rods 81. This ensures that the driving source (the servo motor 71) of the pitch changing mechanism PC can be provided at the central portion of the airframe. This makes the weight of the leading end portion of the arm 12 lighter, and reduces the influence that providing the pitch changing mechanism PC has on stability and agility of flight motions.

In changing the pitch angles of all the rotors 43 using the single servo motor 71, the pitch changing mechanism PC synchronizes the motions of all the first control rods 81 mechanically using a simple structure. This increases the reliability of the pitch angle changing motions, and keeps the weight of the pitch changing mechanism PC itself as low as possible.

By referring to FIG. 4, the pitch lever 82 and the slider member S will be described below. In the following description made by referring to FIG. 4, the direction toward the leading end portion of the arm 12 (the arrow f direction in FIG. 4) will be referred to "front", and the opposite direction (the arrow r direction in FIG. 4) will be referred to as "rear".

A rotor base 13, which is a support member for the rotor 43, is mounted on the leading end portion of the arm 12. The rotor base 13 according to this example is made up of a socket 131, support plates 132, and a reinforcement post. The socket 131 is a hollow-cylindrical connection member threaded and fixed to the leading end portion of the arm 12. The support plates 132 are two planar members extending in the front direction from the socket 131. The support plates 132 are arranged such that each support plate 132 is upper or lower than the other support plate 132 and is parallel to the other support plate 132 and to the horizontal plane. The reinforcement post, 133, is a cylindrical reinforcement material for preventing the support plates 132 from bending. The reinforcement post 133 is arranged such that the reinforcement post 133 stands perpendicularly between front end portions of the two support plates 132. Each of the two support plates 132 prevents the other from bending via the reinforcement post 133. This makes the support plates 132 sufficiently rigid.

The pitch lever 82 is a mechanism that lifts the slider member S upward and downward along a rotor shaft 44, and the pitch lever 82 is one form of the pitch leveler according to the present invention. The pitch lever 82 is a hinge member that has one end portion rotatably supported by a pitch lever base 821, which is a pedestal fixed to the upper surface of the support plate 132. The first control rod 81 is connected to the pitch lever 82 via a pitch lever link 811, which is a link member. By the first control rod 81's reciprocating movement along the arm 12, the pitch lever 82 swings upward and downward about the connection portion at which the pitch lever 82 is connected to the pitch lever base 821.

The slider member S moves upward and downward along the rotor shaft 44 to rotate feathering hinges 88 in the pitch directions of the blades 432. To each of the feathering hinges 88, the corresponding blade 432 of the rotor 43 is connected. In this manner, the slider member S changes the pitch angles of the rotor 43.

The rotor 43 according to this example is made up of: a rotor hub 431, which rotatably supports the feathering hinges 88; the blades 432, which are rotary wings; and blade bases 433, which foldably hold the respective blades 432. The rotor hub 431 is connected to the rotor shaft 44 and rotatable integrally with the rotor shaft 44. Each of the blade bases 433 is connected to the corresponding feathering hinge 88 and rotatable integrally with the feathering hinge 88.

The slider member S according to this example is mainly made up of a pitch control plate 85 and a slider ring 86.

The pitch control plate 85 includes: a hollow-cylindrical body through which the rotor shaft 44 is passed; and a pair of arms extending in the front and rear directions from the body. Two pitch links 851 are connected to the respective feathering hinges 88, and one end portion of each of the pitch links 851 is rotatably supported by the corresponding one of the pair of arms. The slider ring 86 has a hollow-cylindrical body. On the outer circumferential surface of the hollow-cylindrical body, two ring-shaped flanges 861 are provided. Each of the flanges 861 is upper or lower than the other flange 861 and is continuous in the circumferential direction of the hollow-cylindrical body. A groove 862 is formed between the flanges 861. The groove 862 is continuous in the circumferential direction of the outer circumferential surface.

The pitch control plate 85 and the slider ring 86 are connected to each other via a slider sleeve 87, which is a hollow-cylindrical sleeve member 87 passing through the insides of the bodies of the pitch control plate 85 and the slider ring 86. With this configuration, the pitch control plate 85 and the slider ring 86 are integrally movable in the upward and downward directions. The slider sleeve 87 is a half-thread member having a head formed by enlarging in diameter a part of the outer circumferential surface of the slider sleeve 87 to make a flange. With this configuration, the slider sleeve 87 is arranged with the pointed downward and the thread pointed upward. The thread of the slider sleeve 87 is connected with the pitch control plate 85, and the slider ring 86 is provided between the pitch control plate 85 and the head of the slider sleeve 87. It is to be noted that the slider ring 86 is supported by the slider sleeve 87 via a bearing, which makes the pitch control plate 85 rotatable integrally with the rotor shaft 44 and the slider sleeve 87 independently of the slider ring 86.

In the groove 862 of the slider ring 86, a pair of bosses 822 are fitted. The pair of bosses 822 are provided at leading end portions of the respective pitch levers 82. This makes the slider member S liftable upward and downward as the pitch levers 82 move upward and downward.

Figure 5:
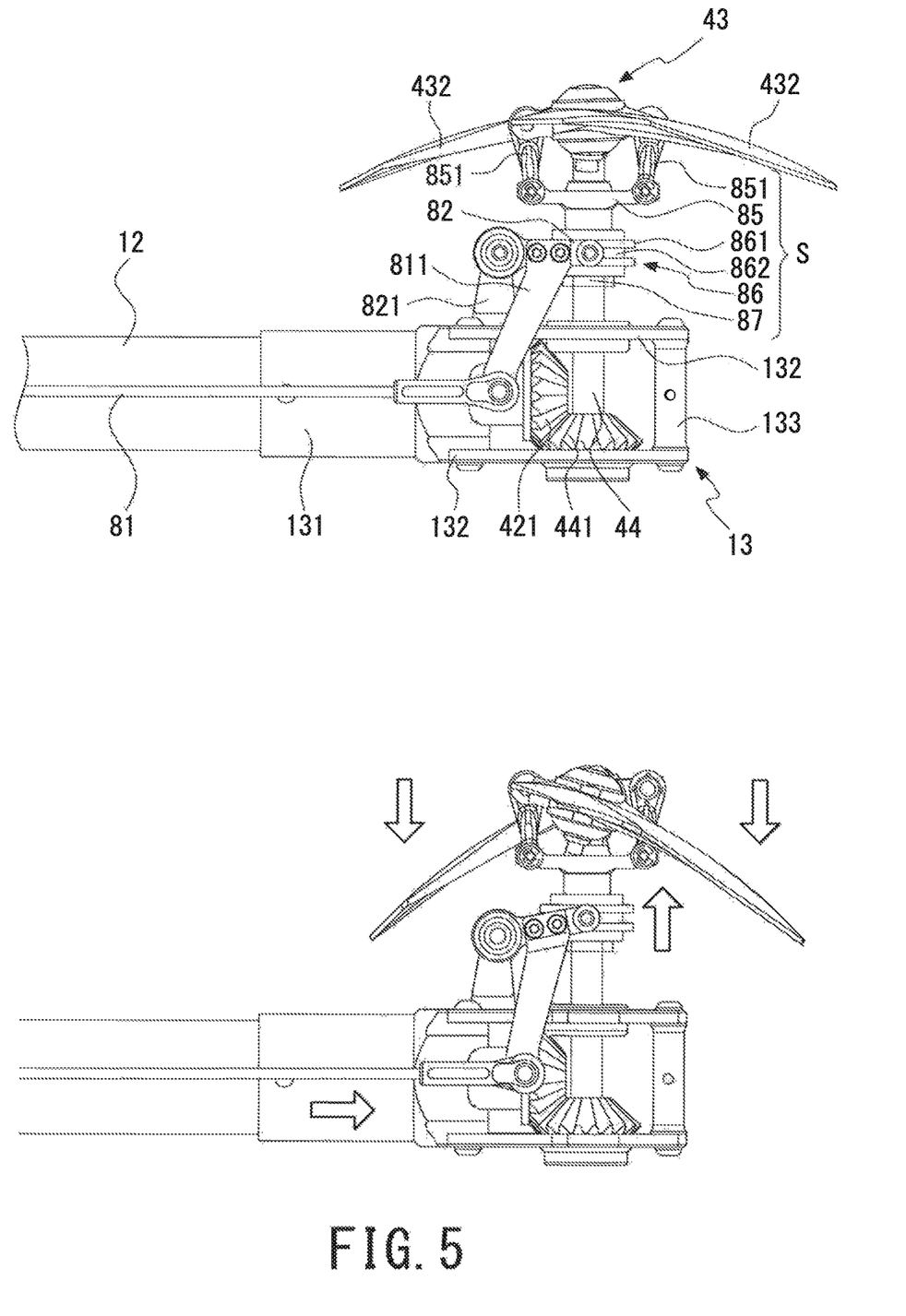
FIG. 5 shows side views of a pitch changing mechanism and a rotor illustrating a pitch-angle changing motion of the rotor implemented by the pitch changing mechanism.

FIG. 5 shows side views of the pitch changing mechanism PC and the rotor 43 illustrating a pitch-angle changing motion of the rotor 43 implemented by the pitch changing mechanism PC.

Upon driving of the servo motor 71 in CW direction in plan view, the second control rods 73, which are connected to the servo horn 711, rotate the respective control hubs 72. Each control hub 72 presses the first control rod 81 connected to the control hub 72 toward the leading end portion of the arm 12. The pressed first control rod 81 lifts the pitch lever 82 via the pitch lever link 811. The lifted pitch lever 82 lifts upward the slider ring 86 and the pitch control plate 85, which is integral to the slider ring 86. The lifted pitch control plate 85 rotates the feathering hinges 88 via the pitch links 851, thereby increasing the incidence angles (pitch angles) of the blades 432.

It is to be noted that while FIG. 5 illustrates a motion to increase the pitch angles of the rotors 43, driving the servo motor 71 in CCW direction decreases the pitch angles of the rotors 43 through the above-described process performed in reverse order.

Thus, the pitch changing mechanism PC according to this example changes the pitch angles of the rotors 43 by collective pitch control (which is control to increase or decrease the pitch angles of all the blades of one rotor simultaneously by an identical angle); the pitch changing mechanism PC does not perform cyclic pitch control, which is generally performed in the main rotor of a helicopter. In the pitch changing mechanism PC according to this example, the structure associated with cyclic pitch control is removed from the pitch changing mechanism PC, in an attempt to simplify the pitch changing mechanism PC.

(Rotor Driving Mechanism)

Figure 6:
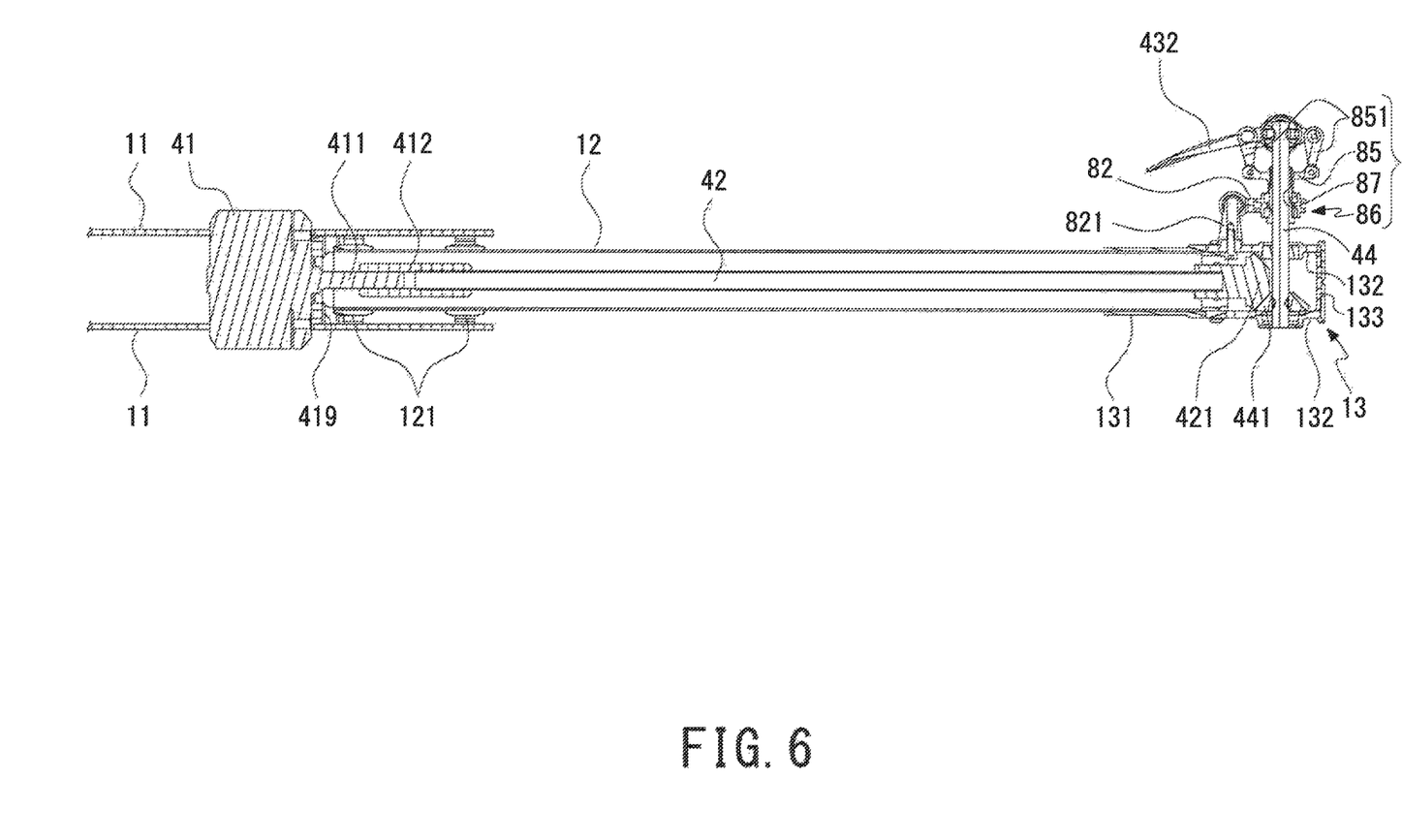
FIG. 6 is a side sectional view of a driving mechanism of the rotor.

FIG. 6 is a side sectional view of a driving mechanism of the rotor 43. By referring to FIGS. 4 and 6, the rotor driving mechanism according to this example will be described. In the following description made by referring to FIG. 6 as well, the direction toward the leading end portion of the arm 12 (the arrow f direction in FIG. 6) will be referred to "front", and the opposite direction (the arrow r direction in FIG. 6) will be referred to as "rear".

As described earlier, in the multi-copter 10 according to this example, the motors 41, which are the driving sources of the respective rotors 43, are provided in the center frame 11, and each motor 41 is fixed to the motor mount 419 with the output shaft 411 of each motor 41 pointed toward the corresponding arm 12.

One end portion (base end portion) of a shaft adapter 412 is mounted on the output shaft 411 of the motor 41. The shaft adapter 412 is a hollow-cylindrical connection member. Another end portion (leading end portion) of the shaft adapter 412 is connected with a drive shaft 42, which is a transmission member of the motive power of the motor 41. The drive shaft 42 has a hollow-cylindrical bar structure, and a driving gear 421, which is a bevel gear, is mounted on a front end portion of the drive shaft 42.

The driving gear 421 is provided in the rotor base 13. An idler gear 441, which is a bevel gear meshed with the driving gear 421, is provided at a lower end portion (base end portion) of the rotor shaft 44, which is rotatably supported by the support plates 132. With this configuration, the output of the motor 41 is transmitted to the shaft adapter 412, the drive shaft 42, the driving gear 421, the idler gear 441, the rotor shaft 44, and the rotor hub 431, in this order, and rotates the rotor 43.

As described earlier, as the weight of the leading end portion of the arm increases, it becomes more difficult to keep the posture of the multi-copter stable because of the influence of inertia of the leading end portion of the arm, to the detriment of agility of flight motions. In the multi-copter 10 according to this example, the motors 41 are provided in the center frame 11, and the output of each motor 41 is transmitted to the corresponding rotor 43 through the drive shaft 42. In this manner, the weight of the leading end portion of the arm 12 is decreased, resulting in improved stability and agility of flight motions.

It is to be noted that the motive power transmission member to transmit the output of the motor 41 the rotor 43 will not be limited to the drive shaft 42 according to this example; for example, it is possible to employ a toothed belt. In this case, however, it is necessary that the output shaft 411 of the motor 41 stand perpendicularly (vertically) in the center frame 11, resulting in degraded spatial efficiency of the inside of the center frame 11. In the multi-copter 10 according to this example, the drive shaft 42 is employed, and this ensures that the output shaft 411 of the motor 41 is pointed toward the arm 12, resulting in increased spatial efficiency of the inside of the center frame 11.

(Functional Configuration)

Figure 7:
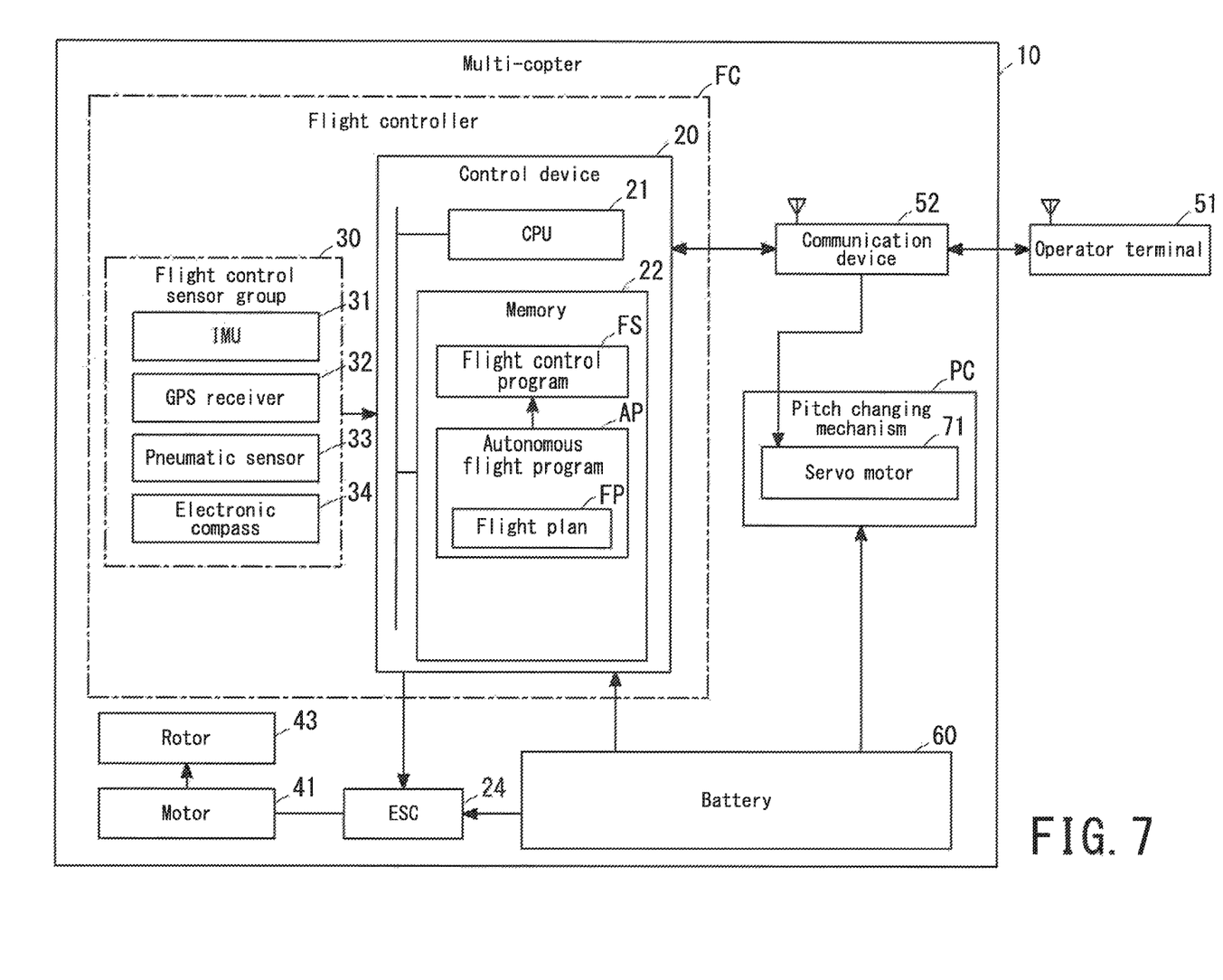
FIG. 7 is a block diagram illustrating a functional configuration of the multi-copter.
Figure 8:
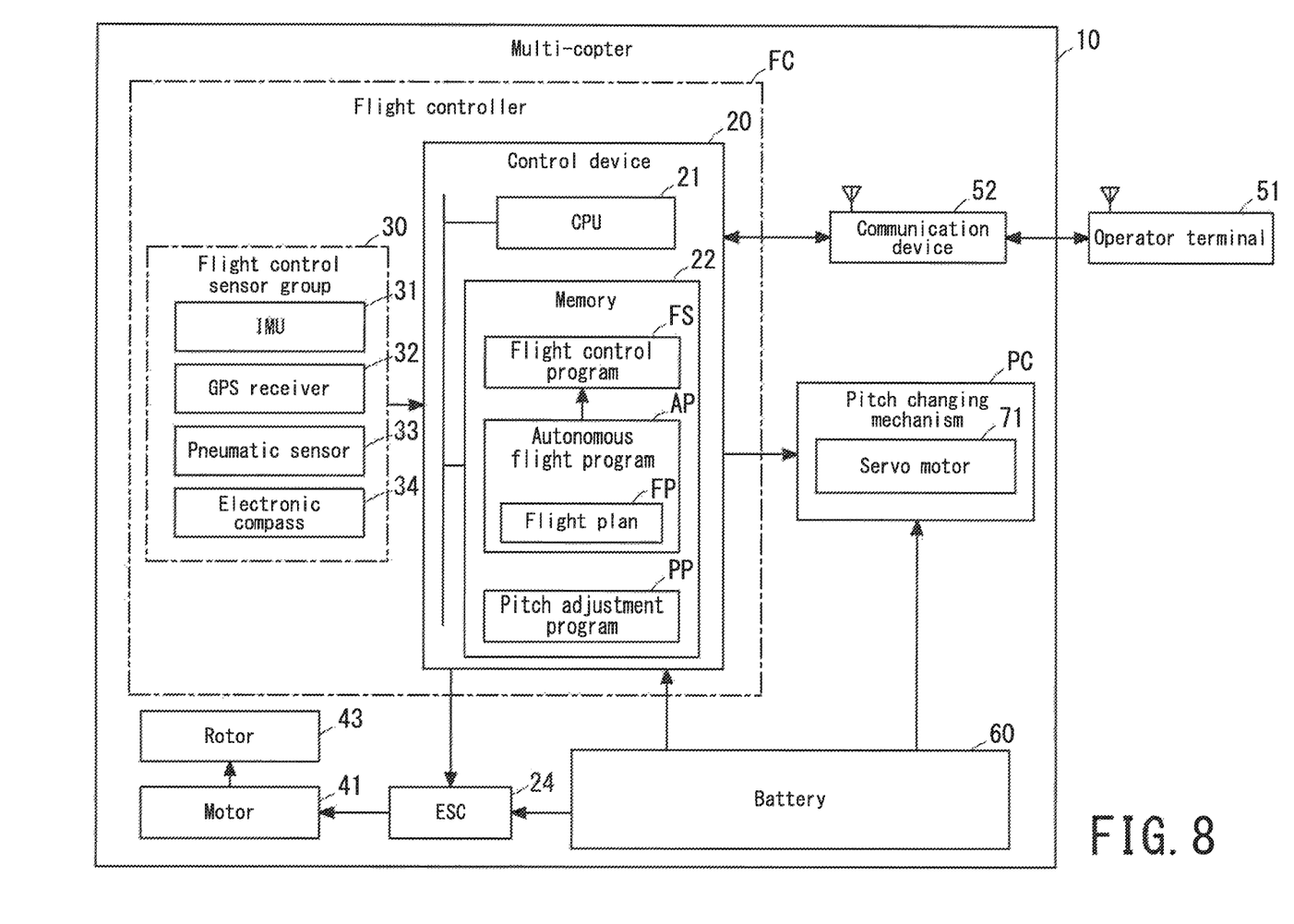
FIG. 8 is a block diagram illustrating a functional configuration of a modification of the multi-copter.

FIGS. 7 and 8 are block diagrams illustrating functional configurations of the multi-copter 10.

The functions of the multi-copter 10 mainly include: the flight controller FC, which is a controller; four rotors 43 and four motors 41; ESCs 24 (Electric Speed Controller), each of which is a motor driving circuit to control the number of rotations (which is equivalent in meaning to rotational speed) of a corresponding motor 41; a communication device 52, which communicates with an operator (operator terminal 51); the above-described pitch changing mechanism PC; and the battery 60, which supplies power to the foregoing elements.

The flight controller FC includes a control device 20, which is a micro-controller. The control device 20 includes: a CPU 21, which is a central processing unit; and a memory 22, which is made up of a RAM and a storage device such as a ROM and a flash memory.

The flight controller FC further includes a flight control sensor group 30, which includes an IMU 31 (Inertial Measurement Unit), a GPS receiver 32, a pneumatic sensor 33, and an electronic compass 34. These elements are connected to the control device 20.

IMU 31 is a sensor that detects an inclination of the airframe of the multi-copter 10, and mainly includes a three-axis acceleration sensor and a three-axis angular velocity sensor. The pneumatic sensor 33 is an altitude sensor that obtains the sea level altitude (height) of the multi-copter 10 from an air pressure value that has been detected. The electronic compass 34 is a sensor that detects the azimuth angle of the airframe nose of the multi-copter 10. In this example, a 3-axis geomagnetic sensor is used as the electronic compass 34. The GPS receiver 32 is, in a strict sense, a receiver in Navigation Satellite System (NSS). The GPS receiver 32 obtains current longitude and latitude values from Global Navigation Satellite System (GNSS) or Regional Navigation Satellite System (RNSS).

The flight controller FC obtains, using the flight control sensor group 30, position information indicating the position of the airframe including: the inclination of the airframe; the rotation of the airframe; the longitude and latitude of the airframe in flight; the altitude of the airframe in flight; and the azimuth angle of the airframe nose in flight.

The control device 20 includes a flight control program FS, which is a program for controlling the posture of the multi-copter 10 during flight and controlling basic flight operations. The flight control program FS adjusts the number of rotations of the individual rotors 43 based on information obtained from the flight control sensor group 30, and causes the multi-copter 10 to fly while correcting the posture and/or position of the airframe of the multi-copter 10.

The control device 20 further includes an autonomous flight program AP, which is a program for causing the multi-copter 10 to fly autonomously. In the memory 22 of the control device 20, a flight plan FP is registered. The flight plan FP includes parameters specifying: longitude and latitude of the path that the multi-copter 10 takes; and altitude and/or speed of the multi-copter 10 in flight. Under the starting condition that an instruction has been transmitted from the operator terminal 51, the autonomous flight program AP causes the multi-copter 10 to fly autonomously based on the flight plan FP.

As the operator terminal 51, it is possible to use a transmitter used for radio control purposes or a device generally referred to as a GCS (Ground Control Station) in the field of unmanned aerial vehicles. Otherwise, the operator terminal 51 may be a terminal used in a traffic management system (UTM: UAV Traffic Management) that controls a large number of multi-copters 10.

The communication device 52 and the operator terminal 51 of the multi-copter 10 may use any communication methods and/or protocols insofar as the device and the terminal are capable of sending and receiving control signals and/or data. A possible example is to: use Wi-Fi (Wireless Fidelity), which is a bidirectional communication protocol, to upload the flight plan FP to the multi-copter 10 and to receive telemetry data; and use frequency hopping in the 2.4 GHz band to transmit PCM (Pulse Code Modulation) signals as manipulation signals at the manipulation time. Otherwise, the multi-copter 10 and the operator terminal 51 may be connected to each other via a mobile communication network such as 3G, LTE (Long Term Evolution), and WiMAX (Worldwide Interoperability for Microwave Access). This enables the operator (operator terminal 51) to control the multi-copter 10 from anywhere in the service area of the mobile communication network.

It is to be noted that while the flight control sensor group 30 according to this example has an outdoor-use configuration, the multi-copter 10 may fly indoors. A possible example is that beacons that transmit wireless signals are arranged at predetermined positions in a facility, and relative distances between the multi-copter 10 and the beacons are measured based on field strengths of the signals received from the beacons so that the position of the multi-copter 10 in the facility is identified. Another possible example is that the multi-copter 10 is provided with a camera or an optical flow sensor to identify the current position of the multi-copter 10 in a facility by image recognition. Similarly, a distance measuring sensor utilizing laser, infrared light, or ultrasonic may be used to measure the distance between the multi-copter 10 and a floor surface (or a ceiling surface) or a wall surface in a facility so that the position of the multi-copter 10 in the facility is identified.

The multi-copter 10 according to this example uses the pitch changing mechanism PC for the sole purpose of uniformly adjusting the pitch angles of the rotors 43, and makes mid-air movements mainly by rotational speed control of the rotors 43. Specifically, the pitch changing mechanism PC makes the pitch angle of a fixed pitch propeller changeable without replacing the propeller, and thus is different from typical pitch changing mechanisms in application and technical concept. The pitch changing mechanism PC according to this example is limited in function and application and thus is simplified in structure. Further, the pitch changing mechanism PC makes mid-air movements mainly by controlling the rotational speeds of the rotors 43.

This ensures that an existing flight controller for a multi-copter can be used without modifications. This ensures that the multi-copter 10 eliminates or minimizes the laboriousness involved in optimal propeller pitch adjustment without causing complexity and instability in the airframe structure and/or the flight program.

In this example, the multi-copter 10 according is under the assumption that the manipulation of changing the pitch angle in the multi-copter 10 is performed by the operator by making an instruction manually to the pitch changing mechanism PC according to the operator's own judgment. Another possible example is to provide a pitch adjustment program PP, which automatically controls the pitch changing mechanism PC, as illustrated in, for example, FIG. 8.

The pitch adjustment program PP is capable of receiving, from the communication device 52, a control signal for the pitch changing mechanism PC and forwarding the control signal to the pitch changing mechanism PC. In addition, the pitch adjustment program PP is capable of automatically controlling the pitch changing mechanism PC under a predetermined condition. It is to be noted that in this case as well, mid-air movements are made mainly by rotational speed control of the rotors 43, and thus it is not necessary to modify the existing flight programs such as the flight control program FS. Also in the example illustrated in FIG. 8, by providing the control device 20 of the flight controller FC with the pitch adjustment program PP, the output values of the flight control sensor group 30 and/or the flight control program FS of the flight controller FC are also used for the control of the pitch changing mechanism PC. Another possible example is to install a controller and/or a sensor dedicated to the pitch adjustment program PP. This makes the pitch adjustment program PP completely independent of the flight controller FC.

The pitch changing mechanism PC is capable of changing the pitch angles of the rotors 43 simultaneously by an identical angle while keeping the pitch angles of the rotors 43 identical to each other. By applying this function, the pitch adjustment program. PP implements the following automatic control.

For example, when the pitch adjustment program PP monitors the output values of the flight control sensor group 30 and/or the flight control program FS and finds that there is a possibility of a posture control disorder judging from the situation in which the number of rotations of the rotor 43 is less than a predetermined threshold, it is possible for the pitch adjustment program PP to make the pitch angle temporarily smaller so as to decrease the thrust relative to the number of rotations of the rotor 43, thereby keeping the number of rotations of the rotor 43. In this manner, the rotors 43 can be prevented from stalling in advance.

Another possible example is that the pitch adjustment program PP automatically keeps the pitch angle as wide as possible to the degree that the number of rotations of the rotor 43 is not less than a predetermined threshold. In order to increase the energy efficiency of the rotor 43, it is preferable to rotate the rotor 43 at low rpm. This, at the same time, makes the rotor 43 vulnerable to an ascending air current. By making the pitch adjustment program PP monitor the number of rotations of the rotor 43 and automatically make the pitch angle as wide as possible within a safety zone, the energy efficiency of the rotor 43 increases while preventing the rotor 43 from stalling. It is to be noted that the number of rotations of the rotor 43 may be calculated by monitoring a control signal, such as a PWM (Pulse Width Modulation) signal, input into the ESC 24. In addition, it is possible to: install a sensor that directly measures the number of rotations of the rotor 43; and/or attach a current sensor to the motor 41.

While the embodiments of the present invention have been described hereinbefore, the present invention will not be limited in scope to these embodiments, and numerous modifications and variations are possible without departing from the spirit of the invention.

The invention claimed is:

1. An unmanned aerial vehicle comprising:
   a plurality of rotors;
   a center frame that is a central portion of an airframe of the unmanned aerial vehicle;
   a plurality of arms extending from the center frame, the plurality of arms having a hollow cylindrical structure, each respective arm of the plurality of arms being attached at an end of the respective arm to a respective rotor of the plurality of rotors;
   a plurality of motors, each motor of the plurality of motors being configured to drive a respective rotor of the plurality of rotors, each motor of the plurality of motors being located in the center frame, and each motor of the plurality of motors includes an output shaft pointed toward the respective arm of the plurality of arms;
   a speed controller configured to control a rotational speed of each rotor of the plurality of rotors;
   a plurality of motive power transmission members configured to transmit a driving force of each motor of the plurality of motors to each respective rotor of the plurality of rotors provided in each respective arm of the plurality of arms; and
   a plurality of drive shafts formed as bar-shaped rotation shafts, each drive shaft of the plurality of drive shafts passing through a respective arm of the plurality of arms, a base end portion of each drive shaft being connected to a respective motor of the plurality of motors, and a leading end portion of each drive shaft being connected, via a bevel gear, to a base end portion of a respective rotor shaft of a plurality of rotor shafts, each respective rotor shaft being a rotation axis of each respective rotor of the plurality of rotors, wherein the unmanned aerial vehicle is configured to make a mid-air movement by controlling the rotational speed of the each rotor of the plurality of rotors.

2. The unmanned aerial vehicle according to claim 1, further comprising a pitch changing mechanism configured to change pitch angles of the plurality of rotors, the pitch changing mechanism being configured to change the pitch angles of the rotors such that the pitch angles of the rotors are identical to each other.

3. The unmanned aerial vehicle according to claim 2, wherein the pitch changing mechanism is configured to change the pitch angles of the plurality of rotors simultaneously by an identical angle while keeping the pitch angles of the rotors identical to each other.

4. An unmanned aerial vehicle comprising:
   a plurality of rotors;
   a center frame that is a central portion of an airframe of the unmanned aerial vehicle;
   a plurality of arms extending from the center frame, the plurality of arms having a hollow cylindrical structure, each respective arm of the plurality of arms being attached at an end of the respective arm to a respective rotor of the plurality of rotors;
   a plurality of motors, each motor of the plurality of motors being configured to drive a respective rotor of the plurality of rotors;
   a speed controller configured to control a rotational speed of each rotor of the the plurality of rotors;
   a plurality of motive power transmission members configured to transmit a driving force of each motor of the plurality of motors to each respective rotor of the plurality of rotors provided in each respective arm of the plurality of arms; and
   a pitch changing mechanism including one pitch changing motor or a plurality of pitch changing motors, operating as a driving source of the pitch changing mechanism, the pitch changing mechanism being configured to:
      change pitch angles of the plurality of rotors, the pitch changing mechanism being configured to change the pitch angles of the plurality of rotors such that the pitch angles of the plurality of rotors are identical to each other, and
      change the pitch angles of the plurality of rotors simultaneously by an identical angle while keeping the pitch angles of the plurality of rotors identical to each other, wherein:
         the unmanned aerial vehicle is configured to make a mid-air movement by controlling the rotational speed of each rotor of the plurality of rotors, and
         a number of the plurality of pitch changing motors is smaller than a number of the plurality of rotors.

5. The unmanned aerial vehicle according to claim 4, wherein the pitch changing mechanism is configured to change all the pitch angles of the plurality of rotors using the one pitch changing motor, which is the driving source of the pitch changing mechanism.

6. The unmanned aerial vehicle according to claim 4, wherein:
   the each rotor of the plurality of rotors includes:
      a blade that is a rotary wing, and
      a rotor hub to which the blade is connected, the rotor hub being connected to a rotor shaft that is a rotation shaft of the each rotor of the plurality of rotors, and
   the pitch changing mechanism includes, in the each rotor of the plurality of rotors:
      a slider member connected to the blade via a pitch link that is a link member,
      a pitch leveler that is a mechanism configured to lift the slider member upward and downward along the rotor shaft, and
      a first control rod that is a bar-shaped link member for operating the pitch leveler, the first control rod extending from the center frame along a respective arm of the plurality of arms, and
   the pitch changing mechanism is configured to change the pitch angles of the rotors by reciprocating all first control rods along the respective arms of the plurality of arms simultaneously by an identical distance.

* * * * *